Dec. 16, 1930.   T. J. CALHOON   1,784,958
MEANS FOR QUICKLY ATTACHING AND DETACHING
TRACTOR WHEEL CLEATS OR LUGS
Filed April 27, 1929   2 Sheets-Sheet 1
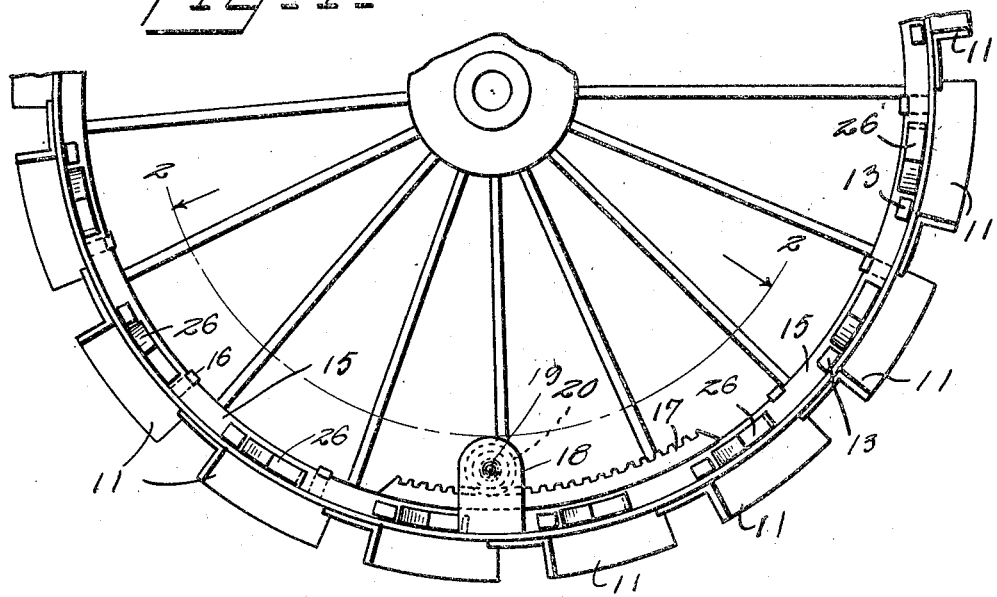
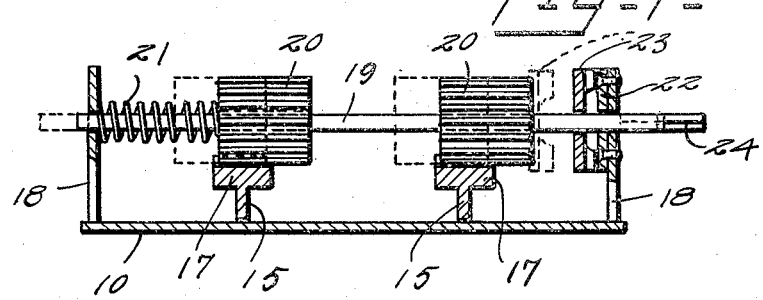
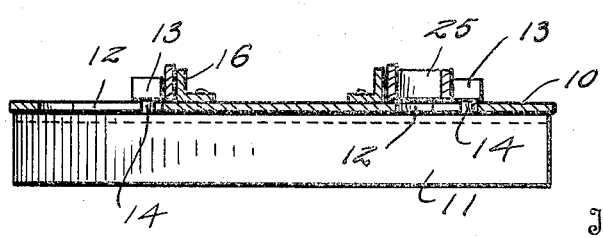
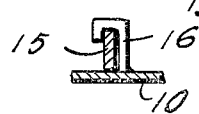
Inventor,
T. J. Calhoon
By Watson E. Coleman
Attorney

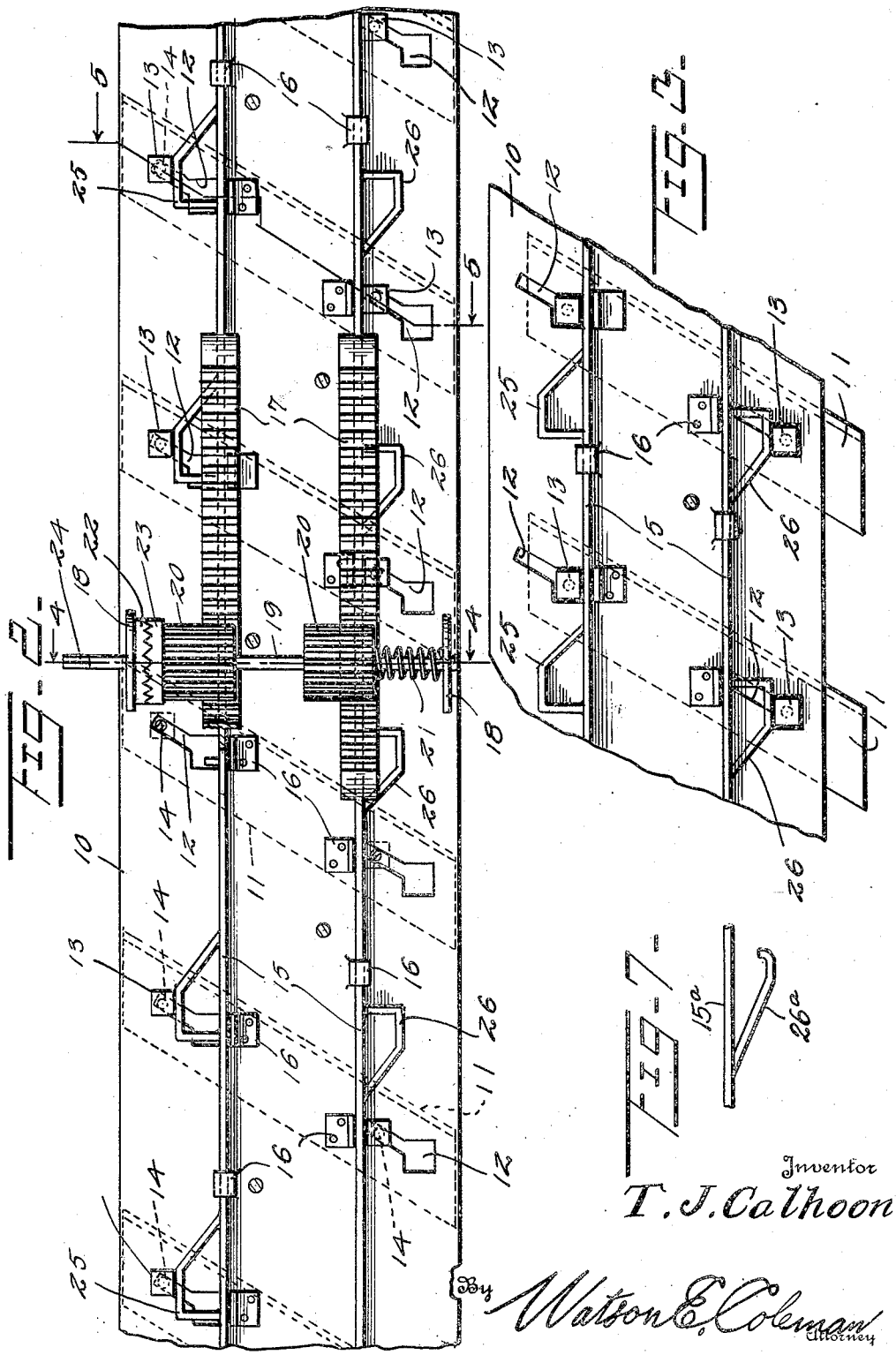

Patented Dec. 16, 1930

1,784,958

UNITED STATES PATENT OFFICE

TILMON J. CALHOON, OF FRANKLIN, ILLINOIS

MEANS FOR QUICKLY ATTACHING AND DETACHING TRACTOR-WHEEL CLEATS OR LUGS

Application filed April 27, 1929. Serial No. 358,726.

This invention relates to traction element mountings for tractor wheels and more particularly to an apparatus for locking the lugs or cleats of tractor wheels in position thereon.

An important object of the invention is to provide apparatus of this character which may be employed to release the lug or cleat when removal thereof is desired, and position this lug or cleat for removal by a lifting operation.

A further and more specific object of the invention is the provision of a structure of this character which may be readily applied to tractor wheels as at present manufactured, and which will simultaneously release all of the lugs or cleats of the wheel.

These and other objects I attain by the construction shown in the accompanying drawings wherein for the purpose of illustration I have shown a preferred embodiment of my invention and wherein:—

Figure 1 is a fragmentary side elevation of a tractor wheel having the traction elements thereof mounted in accordance with my invention;

Figure 2 is a sectional view on line 2—2 of Figure 1;

Figure 3 is a fragmentary view similar to Figure 2, illustrating the traction elements as shifted by the control means preparatory to removal thereof;

Figure 4 is a section on line 4—4 of Figure 2;

Figure 5 is a section on line 5—5 of Figure 2;

Figure 6 is a sectional view showing one of the guides of the annulus;

Figure 7 is a fragmentary view of a portion of the annulus showing a modified form of wedge element.

Referring now more particularly to the drawings, the numeral 10 generally designates a tractor wheel at present shown as having cleats 11 applied thereto. These cleats and wheel are so constructed that the cleats may be disengaged from the wheel by a movement longitudinally thereto and transverse to the wheel. In the present instance, the wheel is disclosed as having keyhole slots 12, the reduced branches of which are directed in the same general direction while the cleats have at the inner surface thereof headed elements 13, the heads of which are passable through the heads of the keyhole slots and the shanks 14 of which are movable into the reduced branches of the keyhole slots, so that the heads lock the cleat in position upon the wheel rim. Thus by a movement transversed to the rim of the cleats may be either locked against separation from the rim or may be positioned so that they may be lifted therefrom.

At the inner surface of the wheel rim I provide spaced annular elements 15, each connecting to the wheel rim by a plurality of guides 16, in which the annular elements are rotatable to permit shifting thereof circumferentially of the wheel rim. These elements have associated therewith racks 17. At opposite sides of the wheel rim I mount bearings 18 in which a shaft 19 is slidably and rotatably mounted. This shaft has gears 20 for engagement with the racks 17.

Between one end of the gear element and one of the bearings 18 a spring 21 surrounds shaft 19 and constantly urges this shaft toward the other of the bearings. The other of the bearings and the confronting faces of the gear element have coacting clutch elements 22 and 23 secured to form a portion of said bearing and the associated gear element 20 respectively, with the result that in the normal position of shaft 19 these clutch elements engage one another and prevent rotation of the shaft about its own axis. The adjacent end of the shaft is extended through the bearing 18 and adapted, as by squaring the same at 24, for engagement with a wrench. By applying a wrench thereto and forcing the shaft longitudinally this shaft may be rotated and when rotated will cause rotation of the annular elements 15. The elements 15 have secured thereto a wedge element 25 and a wedge element 26, respectively, for each cleat 11, the wedge elements 25 constituting locking wedges, and the wedge elements 26, releasing wedges.

The wedge elements 25 are at present shown as carried by the outer faces of one of the annular elements 15, while the wedge elements 26 are carried by the other of these annular elements. The wedge elements 25 and 26, for coaction with a given cleat, are spaced circumferentially of the annular elements with relation to one another.

It will be obvious that when the cleats are placed in position upon the wheel and the annulus rotated to cause the wedges 25 to engage the same, the headed elements and the cleats will be forced transversely of the rim by these wedges, so that the shanks of the headed elements are disposed at the ends of the reduced portions of the keyhole slots 12, the rotation of the shaft 19 is checked and the shaft released so that it may be acted upon by spring 21. Thus the shaft is locked against rotation and the cleats are accordingly locked in position upon the rim. Rotation of the shaft in the opposite direction will cause a release of the cleats by engagement of the wedges 26 with the heads 13 and a consequent transverse movement of the cleats, positioning the heads 13 in registration with the head openings 12 of the keyhole slots. The wedge elements may be either of the solid type illustrated in Figures 1 to 5 or may be of the spring type illustrated in Figure 7 wherein 15a designates the annular member and 26a the wedge element.

When a solid type wedge element is employed, some of the cleats may be applied and seated by hand, these cleats moving into engagement with the ground by shifting the position of the tractor, and then the remaining cleats shifted to their locking position by operation of the annulus having the locking wedges 25. A reversal of this operation is employed when the cleats are to be removed.

With the use of the spring wedges it is simply necessary that all of the cleats be placed in position and the annulus operated. While those cleats which happen to be engaged with the ground will not be shifted during operation of the annulus, they will be shifted to their locking position just as soon as they are shifted out of engagement with the ground by rotation of the wheel through the stored forces of the spring wedges.

While I have in the present instance illustrated the annulus and associated parts as being in the form of a divided structure, this construction is merely adopted as the most convenient means of applying the apparatus to the ordinary spoked tractor wheel and enables convenient assembly of the structure without in any manner modifying the structure of the wheel. Obviously, under certain conditions the annulus more conveniently can be formed as a unit.

Since the structure employed is obviously capable of a very considerable range of change and modification without in any manner departing from the spirit of the invention, I accordingly do not limit myself to such specific structure except as hereinafter claimed.

I claim:—

1. The combination with a tractor wheel and traction elements secured to the wheel by transverse movements upon the rim of the wheel, an annulus upon the inner surface of the rim of the wheel and rotatable with relation thereto, coacting elements upon the traction elements and annulus whereby upon rotation of the annulus the traction element is shifted transversely of the wheel rim, and means for locking the annulus against rotation.

2. The combination with a tractor wheel rim having a transversely extending keyhole slot and a traction element having upon its inner face a headed element the head of which may extend through the head portion of the keyhole slot and the shank of which will fit within the stem of the keyhole slot, and means circumferentially shiftable upon the inner surface of the rim having engagement with said traction element when the headed element thereof is extended through the keyhole slot whereby upon circumferential movement of said means the traction element is shifted transversely of the rim in one direction.

3. In combination with a tractor wheel rim and a traction element including portions extending to the interior of the rim and upon transverse movement of the traction element with relation to the rim having engagement with the rim preventing movement of the traction element, and a member circumferentially shiftable upon the inner surface of the rim having engagement with said portions whereby upon rotation of the member in one direction the traction element is shifted to its position of locking engagement and upon rotation of the member in the opposite direction the traction element is freed for movement into the disengaged position wherein it is removable.

4. In combination, a tractor wheel rim having a circumferential series of pairs of transversely aligned transversely directed keyhole slots, a series of traction elements having headed members for coaction with said slots, members circumferentially shiftable upon the interior of the rim, wedge elements carried by one of the members and coacting with certain of said headed elements during rotation of the member in one direction to shift the traction elements in one direction, and wedge elements carried by the other member and coacting with the remaining headed elements during rotation of the member in one direction to shift the traction elements in the opposite direction.

5. In combination, a tractor wheel rim having a circumferential series of pairs of transversely aligned transversely directed keyhole slots, a series of traction elements having headed members for coaction with said slots, members circumferentially shiftable upon the interior of the rim, wedge elements carried by one of the members and coacting with certain of said headed elements during rotation of the member in one direction to shift the traction elements in one direction, wedge elements carried by the other member and coacting with the remaining headed elements during the rotation of the member in one direction to shift the traction elements in the opposite direction, and means for locking said rotatable members against rotation.

6. The combination with a tractor wheel and traction elements secured to the wheel by transverse movements upon the rim of the wheel, an annulus upon the inner surface of the rim of the wheel and rotatable with relation thereto, coacting elements upon the traction elements and annulus whereby upon rotation of the annulus the traction element is shifted transversely of the wheel rim, a shaft extending transversely of the inner surface of the rim and mounted for rotation and longitudinal shifting movement, a spring normally holding the shaft at one limit of its longitudinal shifting movement, coacting locking means carried by the rim and shaft and engaging when the shaft is at said limit of its movement, a gear carried by the shaft, and a rack upon the annulus with which said gear is in engagement in all longitudinally shifted positions of the shaft.

In testimony whereof I hereunto affix my signature.

TILMON J. CALHOON.